(12) United States Patent
Burton et al.

(10) Patent No.: US 7,467,266 B2
(45) Date of Patent: Dec. 16, 2008

(54) SNAPSHOT MANAGEMENT METHOD APPARATUS AND SYSTEM

(75) Inventors: David Alan Burton, Vail, AZ (US); Mohamad H. El-Batal, Westminster, CO (US); Noel Simen Otterness, Lafayette, CO (US); Alan Lee Stewart, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 10/634,277

(22) Filed: Aug. 5, 2003

(65) Prior Publication Data

US 2005/0033929 A1 Feb. 10, 2005

(51) Int. Cl.
*G06F 12/00* (2006.01)

(52) U.S. Cl. .................. 711/162; 714/15; 707/204; 711/114

(58) Field of Classification Search ................. 711/162, 711/161, 114; 707/204
See application file for complete search history.

(56) References Cited

U.S. PATENT DOCUMENTS

| | | | | |
|---|---|---|---|---|
| 5,649,152 | A | 7/1997 | Ohran et al. ................. | 395/441 |
| 5,790,773 | A | 8/1998 | DeKoning et al. ...... | 395/182.04 |
| 5,832,222 | A | 11/1998 | Dziadosz et al. ........ | 395/200.46 |
| 5,835,953 | A * | 11/1998 | Ohran ......................... | 711/162 |
| 5,845,295 | A | 12/1998 | Houseman et al. .......... | 707/204 |
| 5,875,457 | A * | 2/1999 | Shalit .......................... | 711/114 |
| 5,905,988 | A * | 5/1999 | Schwartz et al. .......... | 707/104.1 |
| 6,038,639 | A | 3/2000 | O'Brian et al. ............. | 711/114 |
| 6,055,604 | A * | 4/2000 | Voigt et al. .................. | 711/117 |
| 6,058,054 | A | 5/2000 | Islam et al. ................. | 365/200 |
| 6,073,209 | A | 6/2000 | Bergsten ..................... | 711/114 |
| 6,078,932 | A | 6/2000 | Haye et al. .................. | 707/204 |
| 6,081,875 | A | 6/2000 | Clifton et al. ............... | 711/162 |
| 6,105,030 | A | 8/2000 | Syed et al. ..................... | 707/10 |
| 6,119,208 | A | 9/2000 | White et al. ................ | 711/162 |
| 6,182,198 | B1 | 1/2001 | Hubis et al. ................. | 711/162 |
| 6,189,079 | B1 | 2/2001 | Micka et al. ................ | 711/162 |
| 6,212,531 | B1 | 4/2001 | Blea et al. ................... | 707/204 |
| 6,282,610 | B1 | 8/2001 | Bergsten ..................... | 711/114 |
| 6,694,413 | B1 * | 2/2004 | Mimatsu et al. ............. | 711/162 |
| 6,792,518 | B2 * | 9/2004 | Armangau et al. .......... | 711/162 |
| 6,823,436 | B2 * | 11/2004 | Krishnamurthy ............ | 711/170 |

(Continued)

FOREIGN PATENT DOCUMENTS

WO     WO 91/20034     12/1991

(Continued)

*Primary Examiner*—Matt Kim
*Assistant Examiner*—Ryan Dare
(74) *Attorney, Agent, or Firm*—Kunzler & McKenzie

(57) ABSTRACT

Snapshot sets comprising snapshot criteria are created, maintained, and executed via a command set designed to facilitate managing and conducting snapshots on data distributed across multiple volumes. Snapshot criteria such as source volume, target volume, redundancy level, copy mode, and the like are added as desired to a snapshot set. Upon invocation of an execute command, the fast replication operations defined by the snapshot set are executed, providing a logically atomic data replication utility potentially involving multiple sources and targets. In one embodiment auto selection of a target may be specified, thus facilitating over-subscription of target resources. The present invention reduces the complexity of archiving data—particularly data distributed across multiple volumes such as data associated with database applications and the like.

20 Claims, 4 Drawing Sheets

U.S. PATENT DOCUMENTS

| | | | |
|---|---|---|---|
| 6,826,666 B2 * | 11/2004 | Berkowitz et al. | 711/162 |
| 6,934,822 B2 * | 8/2005 | Armangau et al. | 711/162 |
| 6,948,038 B2 * | 9/2005 | Berkowitz et al. | 711/162 |
| 6,973,556 B2 * | 12/2005 | Milligan et al. | 711/202 |
| 2003/0046270 A1 * | 3/2003 | Leung et al. | 707/1 |
| 2003/0079102 A1 * | 4/2003 | Lubbers et al. | 711/202 |
| 2003/0084241 A1 * | 5/2003 | Lubbers et al. | 711/114 |
| 2004/0078376 A1 * | 4/2004 | Kusama et al. | 707/100 |
| 2004/0078533 A1 * | 4/2004 | Lee et al. | 711/162 |
| 2004/0162940 A1 * | 8/2004 | Yagisawa et al. | 711/114 |
| 2004/0181641 A1 * | 9/2004 | Nguyen et al. | 711/162 |
| 2004/0254964 A1 * | 12/2004 | Kodama et al. | 707/204 |
| 2004/0255833 A1 * | 12/2004 | Thompson et al. | 111/165 |
| 2004/0260897 A1 * | 12/2004 | Sanchez et al. | 711/162 |
| 2004/0260898 A1 * | 12/2004 | Stanley et al. | 711/162 |

FOREIGN PATENT DOCUMENTS

| | | |
|---|---|---|
| WO | WO 00/07104 | 2/2000 |

* cited by examiner

500

| 515 | snapshotSetCreate |
| 525 | snapshotSetDelete |
| 535 | snapshotSetAddCriteria |
| 545 | snapshotSetRemoveCriteria |
| 555 | snapshotSetGet |
| 565 | snapshotSetExecute |
| 575 | snapshotSetTerminate |

| 610 | BackgroundCopy |
| 620 | PartialVolume |
| 622 | SourceVolume |
| 624 | SourceExtents |
| 630 | RedundancyLevel |
| 632 | AutoSelectTarget |
| 634 | TargetVolume |
| 636 | TargetExtents |

Fig. 6

SNAPSHOT MANAGEMENT METHOD APPARATUS AND SYSTEM

BACKGROUND OF THE INVENTION

1. The Field of the Invention

The invention relates to methods, devices, and systems for archiving data. Specifically, the invention relates to methods, devices, and systems for managing and conducting fast replication operations within storage sub-systems.

2. The Relevant Art

Data processing systems often work with large amounts of data and require means and methods to manage the storage and archiving of that data. For example, transaction processing systems typically access large databases and log results such as transaction records at a very high rate. The ability to quickly and reliably copy data from one storage area to another enables the deployment of efficient and reliable high-performance processing applications and systems.

Fast replication techniques such as IBM's flashcopy technology have been developed in response to the need for efficient copying mechanisms within high-performance processing systems. A fast replication operation gives the appearance of an instantaneous copy while the actual transfer of data is conducted as a background process, or deferred until the data to be copied is about to be overwritten. With fast replication techniques, applications may conduct data snapshots (point-in-time copies) and continue processing rather than suspending operation while the data transfers occur.

In addition to increased performance, fast replication capable systems simplify the code complexity of I/O intensive processes such as those conducted on large mainframe systems and the like. For example, fast replication techniques relieve applications from error prone memory management and housekeeping tasks. System performance may also be increased in that support for fast replication operations may be provided by low-level drivers and devices that are optimized for performance.

Fast replication capable systems often support multiple concurrent fast replication data transfers. Since the data transfer may be deferred indefinitely, the act of initiating a fast replication operation between a source and a target volume is often referred to as "establishing a fast replication relationship." Likewise, canceling a pending fast replication transfer may be referred to as "withdrawing a fast replication relationship."

Without support for fast replication relationships, conducting a point-in-time copy often requires that a system suspend all tasks that access a source and/or target device. Since many systems do not have explicit knowledge of the devices that will be accessed by each task, those systems require suspension of all tasks except for the task conducting the actual fast replication operations. Suspension of the various tasks or processes in order to conduct fast replication operations greatly reduces the performance of multi-tasking systems.

One challenge of fast replication capable systems, particularly those systems capable of establishing multiple simultaneous fast replication relationships on a sub-volume basis, is managing the many relationships that may be involved in creating a snapshot. Multiple applications or utilities may share a core set of data files that may be distributed across multiple volumes. Furthermore, each target volume in a fast replication relationship must be identified previous to establishing a relationship. Requiring each application or system utility to be aware of all the resources and relationships involved in conducting a snapshot creates a logistical nightmare for system administrators, application developers, and users.

What is needed are means and methods for managing and conducting snapshot operations that reduce the programming and administrative burdens associated with snapshot operations, particularly snapshot operations involving data distributed across multiple volumes of a storage subsystem or network.

SUMMARY OF THE INVENTION

The various elements of the present invention have been developed in response to the present state of the art, and in particular, in response to the problems and needs in the art that have not yet been fully solved by currently available snapshot management methods. Accordingly, the present invention provides an improved method, apparatus, and system for managing and conducting snapshot operations.

In one aspect of the present invention, a method for managing and conducting snapshot operations includes adding snapshot criteria to a snapshot set, and initiating a plurality of fast replication operations as specified by the snapshot set. The method may also include one or more operations selected from the following: creating the snapshot set, deleting a specified snapshot set, provide information regarding a specified snapshot set, deleting specified snapshot criteria from the snapshot set, and terminating the plurality of fast replications operation specified by the snapshot set.

In one embodiment, the snapshot criteria is specified using a data structure containing a variety of data fields related to snapshot operations. In the aforementioned embodiment the data fields include, a source volume indicator, a target volume indicator, an auto-select target indicator, a partial volume indicator, a source extents indicator, a target extents indicator, a redundancy level indicator, and a background copy indicator. The ability to define criteria for snapshot (i.e. fast replication) operations reduces the programming burden associated with managing and conducting snapshot operations.

In another aspect of the present invention, a programming interface for managing and conducting snapshot operations includes an Add to Snapshot Set function configured to add snapshot criteria to a snapshot set, and an Execute Snapshot Set function configured to initiate a plurality of fast replications operations as specified by the snapshot set. The programming interface may also include a Create Snapshot Set function configured to create a snapshot set, a Delete Snapshot Set function configured to delete a specified snapshot set, a Remove From Snapshot Set function configured to delete specified snapshot criteria from the snapshot set, a Get Snapshot Set function configured to provide information regarding a specified snapshot set, and a Terminate Snapshot Set function configured to terminate the plurality of fast replications operations specified by the snapshot set.

The programming interface facilitates accessing the functionality of the present invention from an application, system utility or the like that may be external to the hardware executing the snapshot management methods of the present invention.

In another aspect of the present invention, an apparatus for managing and conducting snapshot operations includes a snapshot management module that manages snapshot sets and a snapshot execution module that executes snapshot operations defined within the snapshot sets. In one embodiment, snapshot execution modules from each controller involved in the snapshot set are marshalled to conduct the snapshot operations specified within a snapshot set.

The various elements of the present invention may be combined into a system for managing and conducting snapshot operations that includes a plurality of storage volumes configured to store data and one or more storage controllers configured to manage the storage volumes, add snapshot criteria to a snapshot set, and initiate a plurality of fast replications operations as specified by the snapshot set.

The various elements and aspects of the present invention facilitate managing and conducting multiple snapshot operations as an atomic operation. The present invention reduces the programming burden associated with conducting snapshot operations and is particularly useful for archiving data distributed across multiple volumes such as data related to database applications and the like. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a text-based diagram illustrating a snapshot management programming interface of the present invention; and FIG. 6 is a block diagram illustrating a snapshot criteria data structure in accordance with the present invention.

DETAILED DESCRIPTION OF THE INVENTION

Many of the functional units described in this specification have been labeled as modules, in order to more particularly emphasize their implementation independence. For example, modules may be implemented in software for execution by various types of processors. The software may include computer-readable code stored on a computer readable/useable medium and integrated into a computing system. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices.

Figure 1:
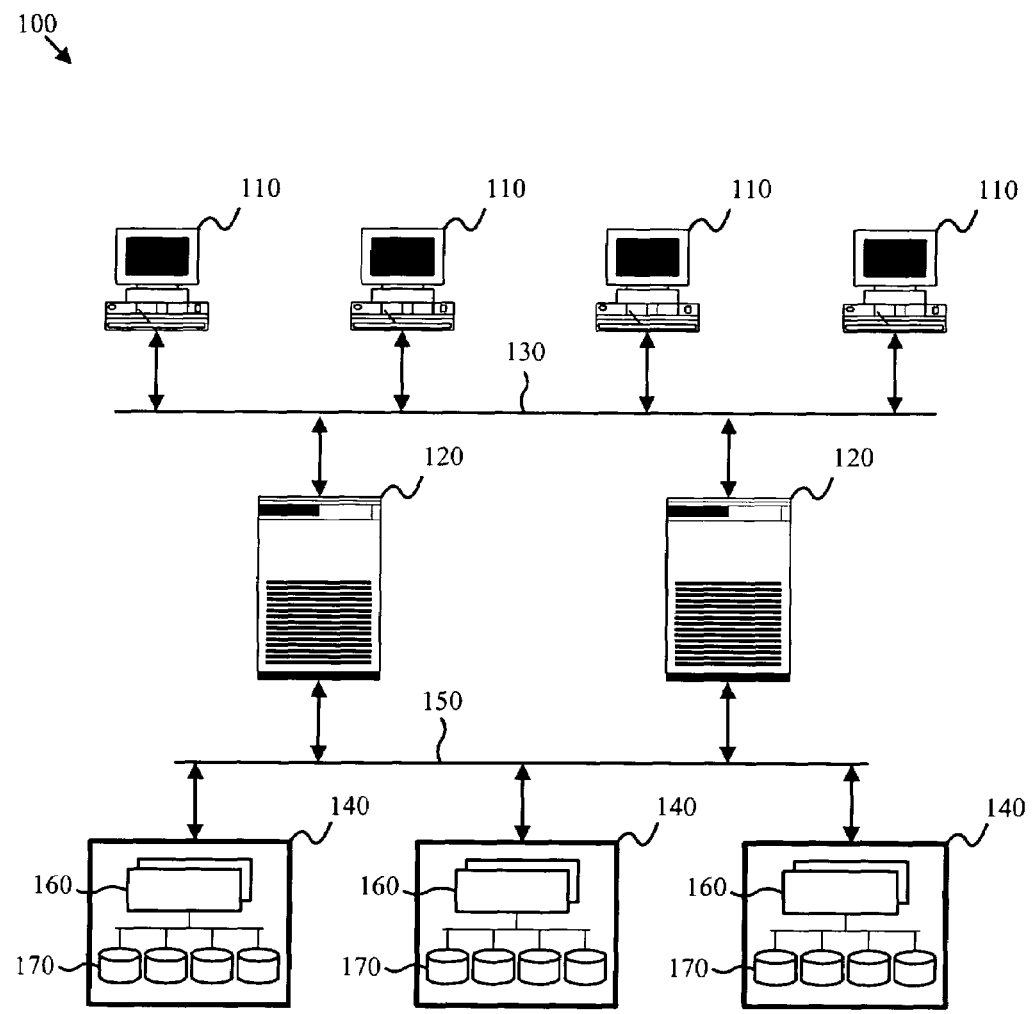
FIG. 1 is a block diagram illustrating a network system representative of an environment wherein the present invention may be deployed.

FIG. 1 is a block diagram illustrating a network system 100 representative of an environment in which the present invention may be deployed. The depicted network system 100 includes a plurality of workstations 110 and servers 120 interconnected via a network 130. The network 100 may comprise any type of network including a local area network and/or a wide area network.

The depicted network system 100 also includes one or more storage subsystems 140 interconnected with the servers 120 via a storage network 150. In one embodiment, the servers 120 are mainframe computers configured to conduct high bandwidth I/O operations with the storage subsystems 140. In the depicted embodiment, the storage subsystems 140 are fault tolerant subsystems containing redundant storage controllers 160 and storage devices 170.

Figure 2:
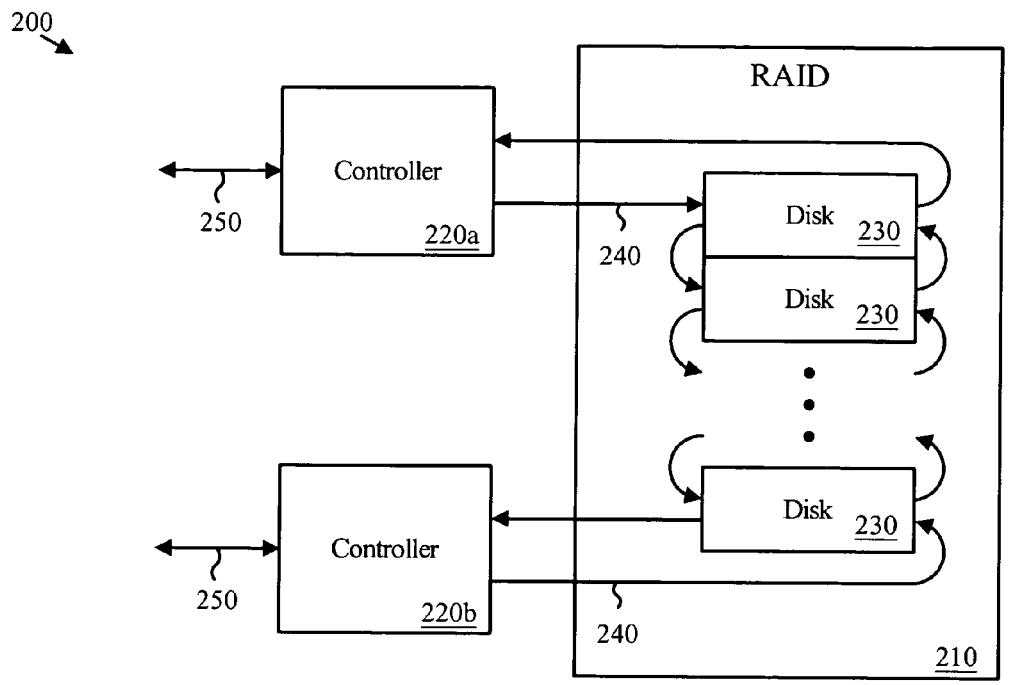
FIG. 2 is a block diagram illustrating a storage subsystem representative of an environment wherein the present invention may be deployed.

FIG. 2 is a schematic block diagram of a storage subsystem 200 illustrating the need for the present invention. The storage subsystem 200 is a representative example of subsystems in which the present invention may be deployed and is one example of the storage subsystem 140 depicted in FIG. 1. The storage subsystem 200 includes a storage array 210 and one or more controllers 220. The storage subsystem 200 may include a plurality of controllers 220 that achieve increased reliability through redundancy. Additionally, the storage array 210 may also achieve increased reliability by interconnecting multiple storage devices 230 via an array loop 240.

In the depicted embodiment, the storage devices 230 are interconnected with an array loop 240. The array loop 240 also interconnects the controllers 220 with the storage array 210. The array loop 240 circulates communications in both directions to increase reliability and throughput. In one embodiment, the array loop 240 is a point-to-point loop such as those defined by the fibre channel standard.

In the depicted embodiment, the controllers 220 each support a host connection 250. The controllers 220 receive access requests via the host connection 250 and service those requests by transferring blocks of data to and from the storage array 210. The blocks of data that are transferred to the storage array 210 may be redundantly encoded to permit error detection and data recovery in the event of failure of one of the storage devices 230. Typically, the controllers 220 organize the storage devices 230 in a redundant manner and present one or more volumes for use by one or more servers or hosts such as those depicted in FIG. 1.

In addition to connection and data redundancy, the controllers 220 may support various types of fast replication operations. Fast replication operations provide the appearance of an instant copy between a source volume and a target volume within a storage subsystem such as the storage subsystem 200. Fast replication operations conduct data transfers from the source volume to the target volume at the convenience of the storage subsystem 200 without halting access to the source or target volumes by an external device, such as a host or server.

The present invention reduces the complexity of conducting fast replication operations and their associated background copies and is particularly useful when conducting snapshot or other fast replication operations on data distributed across multiple volumes such as data associated with database applications and the like.

Figure 3:
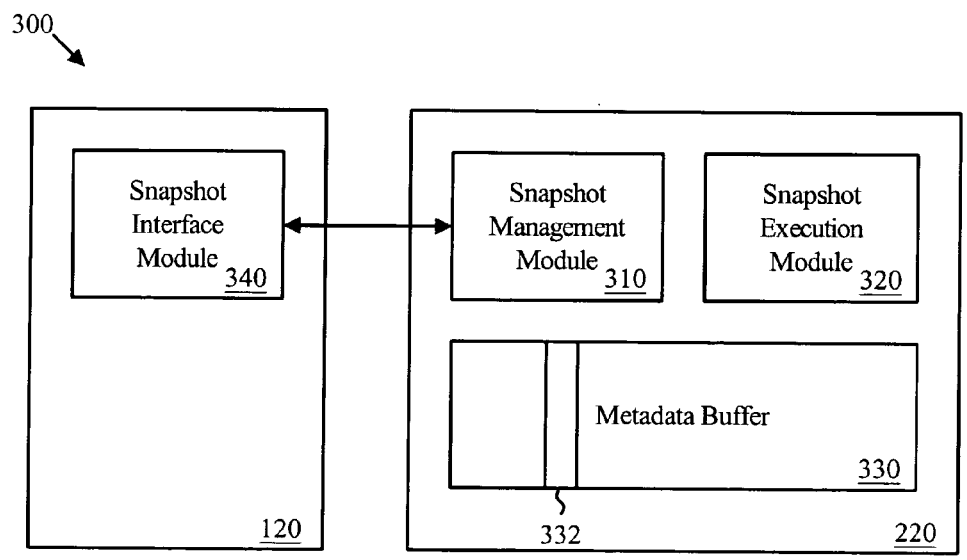
FIG. 3 is a block diagram illustrating one embodiment of a snapshot management system of the present invention.

FIG. 3 is a block diagram illustrating one embodiment of a snapshot management system 300 of the present invention. The depicted snapshot management system 300 includes a snapshot management module 310, a snapshot execution module 320, a metadata buffer 330, and in selected embodiments, a snapshot programming interface 340. The snapshot management system 300 manages snapshot operations and may be contained on selected controllers, or on each controller within a storage subsystem such as the storage subsystem 140. In the depicted embodiment the snapshot management module 310, the snapshot execution module 320, and the metadata buffer 330 are located in a controller 220, and the snapshot interface module 340 is located in a server 120.

The snapshot management module 310 receives commands related to defining and conducting snapshot operations. The metadata buffer 330 contains metadata related to storage-based operations including data related to snapshot or fast replication operations. As depicted, snapshot definitions in the form of specific snapshot criteria are received, aggregated, and stored as one or more snapshot sets 332 within the metadata buffer 330.

Each snapshot set 332 may specify criteria for one or more fast replication operations that are seen as an atomic operation from the viewpoint of an application, system utility, or the like. Multiple volumes may be referenced within each snapshot set 332 in order to conduct snapshot operations on data distributed across multiple volumes. Examples of snapshot criteria contained within the snapshot set 332 will be discussed in greater detail in conjunction with FIG. 6.

In one embodiment, the snapshot management module 310 receives commands from a snapshot interface module 340 residing on a host that provides a programming interface to an application, system utility, or the like. In the aforementioned embodiment, the commands received from the snapshot interface module correspond to function calls provided by the snapshot interface module 340 that may be invoked by an application, system utility, or the like. One example of a set of function calls suitable for use by the snapshot interface module 340 will be described subsequently in conjunction with FIG. 5.

The snapshot execution module 320 executes fast replication (i.e. snapshot) operations defined by the snapshot criteria within each snapshot set. Multiple snapshot execution modules 320 located on different controllers may be marshalled to conduct the specified snapshot operations. In addition, some searching may be conducted by the snapshot management module 320 to find the target volumes, controllers, and snapshot execution modules 320 best suited to fulfill the snapshot criteria specified within each snapshot set.

Figure 4:
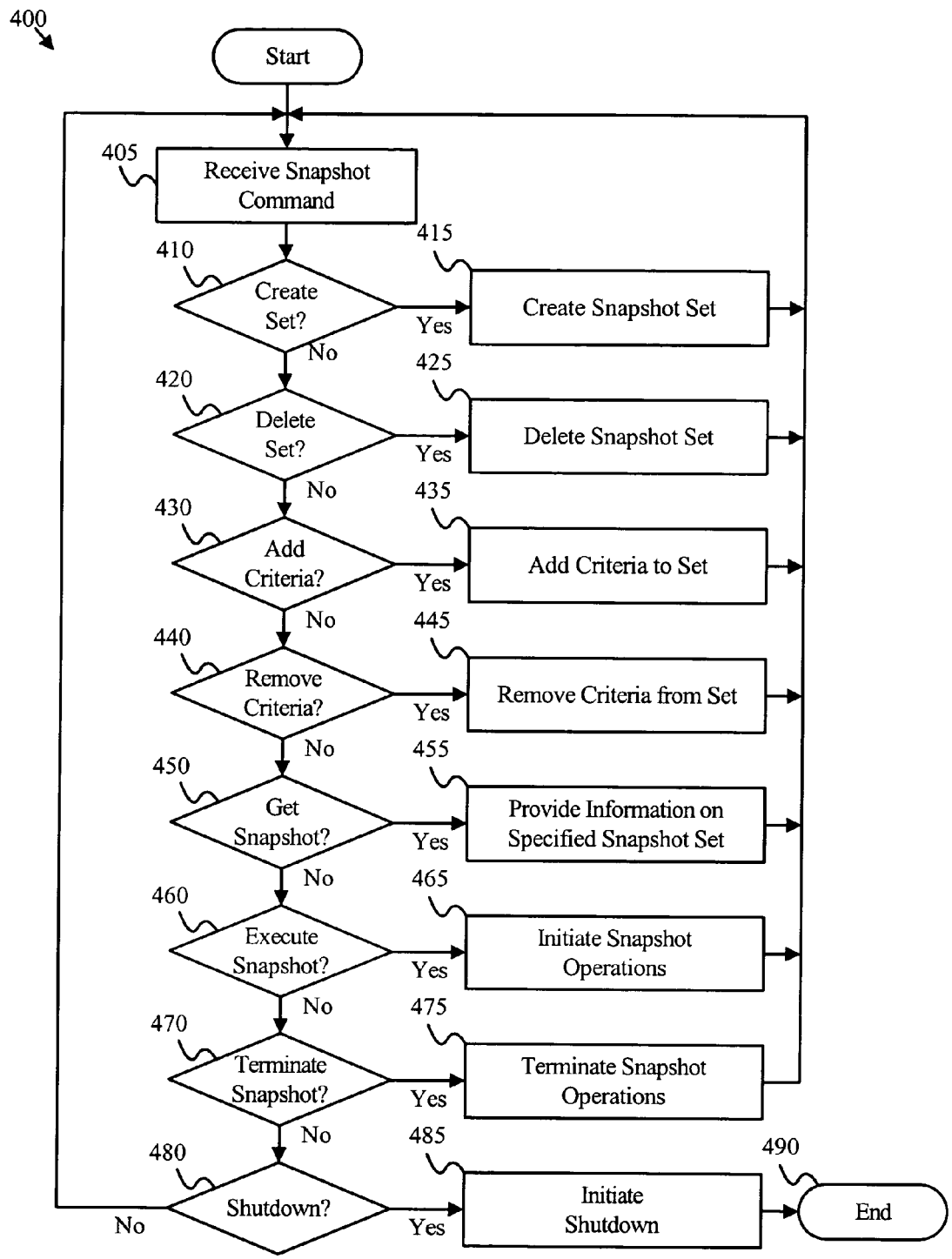
FIG. 4 is a flow chart illustrating a snapshot management method of the present invention.

FIG. 4 is a flow chart illustrating a snapshot management method 400 of the present invention. The snapshot management method 400 may be conducted by the snapshot management module 310 contained within a storage controller 220 such those depicted in FIG. 3. The snapshot management method 400 may be used to manage and conduct snapshot operations via the snapshot sets aggregated within the metadata buffer 330.

As depicted, the snapshot management method 400 executes a variety of procedures related to managing and conducting snapshot operations. In response to reception of a snapshot command at step 405, the precise command is ascertained via a variety of command tests, and a corresponding procedure is executed.

The depicted command tests, include a create test 410, a delete test 420, an add criteria test 430, a remove criteria test 440, a get set test 450, an initiate snapshot test 460, a terminate snapshot test 470, and a shutdown test 480. The procedures associated with the depicted tests include, respectively, a create set procedure 415, a delete set procedure 425, an add criteria procedure 435, a remove criteria procedure 445, a provide information procedure 455, an initiate snapshot procedure 465, a terminate snapshot procedure 475, and an initiate shutdown procedure 485.

The create set procedure 415 creates a snapshot set. In one embodiment, the created snapshot set is an empty list with a unique worldwide identification number (WWN) referred to as a snapshot setID. The setID facilitates distinguishing snapshot sets created on different controllers within a storage sub-system, storage network, wide-area network, or the like. The created snapshot set may be stored within a dedicated dataspace such as the metadata buffer 330 depicted in FIG. 3.

The empty list created by the create set procedure 415 functions as a placeholder for subsequently specified snapshot criteria. In another embodiment, snapshot criteria or references to snapshot criteria may be sent along with the command associated with the create set procedure 415 and included within the created snapshot set.

In contrast to the create set procedure 415, the delete set procedure 425 deletes a snapshot set along with the specified snapshot criteria. In order to avoid generating duplicate setIDs, the setID may be retained on the originating controller.

The add criteria procedure 435 adds specified snapshot criteria to a snapshot set. Likewise the remove criteria procedure 445 removes specified snapshot criteria from a snapshot set. In one embodiment, the snapshot criteria are specified via a data structure containing a plurality of data fields described in conjunction with FIG. 6.

The provide information procedure 455 provides information pertaining to a specified snapshot set to a requestor. The provided information may include a list of WWNs of other controllers involved in the specified snapshot set. In one embodiment, a snapshot set may be specified using a setID or by using first, last, previous, and next designators to iterate through the snapshot sets contained within a controller.

The initiate snapshot procedure 465 initiates the snapshot operations within a snapshot set appearing, logically, as an atomic snapshot operation. The terminate snapshot procedure 475 terminates initiated snapshot operations while the initiate shutdown procedure 485 initiates a shutdown process and terminates the snapshot management method 400.

The snapshot management method 400 facilitates managing and conducting snapshot operations on data that may be distributed across multiple volumes. While the snapshot management method 400 is depicted as an execution loop with a separate test for each procedure that may be executed, a variety of invocation mechanisms known to those skilled in the art may used to execute the various procedures or steps included in the method 400. Examples include an index driven procedure table common to code libraries and the like, and a set of event driven interrupts where each procedure is associated with a unique (software) interrupt.

The depicted method 400 may be deployed within selected controllers or within every controller within a storage sub-system, storage network, wide-area network or the like. In one embodiment, the controllers involved with each snapshot set are included within the snapshot set and each involved controller is given a complete copy of the snapshot set. In the aforementioned embodiment, a command corresponding to the initiate snapshot procedure 465 may be sent to any controller having a copy of the snapshot set resulting in initiation of the fast replication operations specified in the snapshot set. In one embodiment, the command may be transmitted from any server 120 in a system 100.

Referring to FIG. 5, a snapshot management programming interface 500 provides a programming interface (API), for example on a host, for invoking the procedures of the snapshot management method 400. The depicted interface 500 is one example of the snapshot interface 340 depicted in FIG. 3. The programming interface 500 simplifies the complexity of invoking the functionality provided by the snapshot management method 400.

As depicted, the programming interface 500 includes a plurality of functions for generating and managing a snapshot set. In one embodiment, the functions include, by way of example, a Create Snapshot Set function 515 and a Delete Snapshot Set function 525 corresponding to the create set procedure 415 and the delete set procedure 425. The functions 515 and 525 facilitate creating and deleting snapshot sets. The depicted programming interface 500 also includes by way of example, an Add to Snapshot Set function 535 and a Remove From Snapshot Set function 545 corresponding to the add criteria procedure 435 and the remove criteria procedure 445. The functions 535 and 545 facilitate adding and removing criteria to a snapshot set.

The depicted programming interface 500 also includes in this example a Get Snapshot Set function 555 corresponding to the provide information procedure 455, an Execute Snapshot Set function 565 corresponding to the initiate snapshot procedure 465, and a Terminate Snapshot Set function 575 corresponding to the terminate snapshot procedure 475. The function 555 provides information regarding a specified snapshot set, while the functions 565 and 575 facilitate initiating and terminating snapshot operations defined by a specified snapshot set.

Referring to FIG. 6, a snapshot criteria data structure 600 includes a variety of data fields useful for defining snapshot operations that are to be conducted with the present invention. The depicted data structure 100 is one example of snapshot criteria that may be contained within the snapshot set 332 depicted in FIG. 3. The depicted data fields specify the nature of a fast replication operation that is to be included within a snapshot set and thereby provide a mechanism for conducting multiple fast replication operations as an atomic process from the vantage point of an application, system utility, or the like.

As depicted the snapshot criteria data structure 600 includes a background copy indicator 610, a partial volume indicator 620, a source volume indicator 622, a source extents indicator 624, a redundancy indicator 630, an autoselect target indicator 632, a target volume indicator 634, and a target extents indicator 636.

The background copy indicator 610 indicates whether the data transfers related to the snapshot operations are to be conducted as a background operation or deferred until the data to be transferred is about to be overwritten on the source volume. The partial volume indicator 620 indicates whether the entire volume is to be snapshot or a partial volume is to be snapshot as indicated by the source extents indicator 624. The source volume indicator 622 indicates the volume to be snapshot while the source extents indicator 624 indicates the starting and ending indices of the regions (such as blocks, sectors or tracks) to be snapshot.

The redundancy indicator 630 indicates the level of redundancy required for the target volume. In one embodiment, the redundancy levels range from JBOD (no redundancy) to RAID level 50. The auto-select target indicator 632 indicates whether the target volume is to be automatically selected or manually specified via the target volume indicator 634 and the target extents indicator 636. The target volume indicator 634 indicates the target volume for the included snapshot operation while the target extents indicator 636 indicates the starting and ending indices of the regions to be used on the target volume.

The present invention facilitates conducting multiple snapshot operations as an atomic operation and simplifies the complexity of managing those operations. Snapshot criteria are used to specify the fast replications operations involved in the atomic snapshot operation. Criteria may be specified without requiring a precise knowledge of the available target volumes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program, wherein the computer readable program when executed on a computer causes the computer to:

add snapshot criteria to a snapshot set stored in a metadata buffer, the snapshot criteria comprising a source volume indicator, a target volume indicator, an auto-select target indicator, a redundancy level indicator, a partial volume indicator, a background copy indicator, and a source extents indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and execute the plurality of fast replications operations comprising creating a snapshot set defined by metadata in the metadata buffer and deleting a specified snapshot set as specified by the snapshot set.

2. The computer program product of claim 1, wherein the computer readable program is further configured to cause the computer to:

delete specified snapshot criteria from the snapshot set; and
terminate the plurality of fast replications operations specified by the snapshot set.

3. The computer program product of claim 1, wherein the computer readable program is further configured to cause the computer to provide information regarding a specified snapshot set.

4. An apparatus for managing and conducting fast replication operations, the apparatus comprising:

a snapshot management module configured to add snapshot criteria to a snapshot set stored in a metadata buffer, the snapshot criteria comprising a source volume indicator, a target volume indicator, an auto-select target indicator, a redundancy level indicator, a partial volume indicator, a source extents indicator, and a background copy indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and a snapshot execution module configured to execute the plurality of fast replications operations comprising creating a snapshot set defined by metadata in the metadata buffer and deleting a specified snapshot set as specified by the snapshot set.

5. The apparatus of claim 4, wherein the snapshot execution module is further configured to terminate the plurality of fast replications operations specified by the snapshot set.

6. The apparatus of claim 4, wherein the snapshot management module is further configured to manage a list of controllers associated with the snapshot set.

7. The apparatus of claim 4, wherein the snapshot management module is further configured to delete specified snapshot criteria from the snapshot set and the snapshot execution module is further configured to terminate the plurality of fast replications operations specified by the snapshot set.

8. The apparatus of claim 4, wherein the snapshot management module is further configured to provide information regarding a specified snapshot set.

9. An apparatus for managing and conducting fast replication operations, the apparatus comprising:

means for adding snapshot criteria to a snapshot set stored in a metadata buffer, the snapshot criteria comprising a source volume indicator, a target volume indicator, an auto-select target indicator, a redundancy level indicator, a partial volume indicator, a source extents indicator, a redundancy level indicator, and a background copy indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and means for executing the plurality of fast replications operations comprising creating a snapshot set defined by metadata in the metadata buffer and deleting a specified snapshot set as specified by the snapshot set.

10. The apparatus of claim 9, further comprising:
means for managing a list of controllers associated with the snapshot set;
means for creating the snapshot set;
means for deleting a specified snapshot set;
means for removing specified snapshot criteria from the snapshot set;
means for terminating the plurality of fast replications operations specified by the snapshot set; and
means for providing information regarding a specified snapshot set.

11. A method for managing and conducting fast replication operations, the method comprising:

adding snapshot criteria to a snapshot set stored in a metadata buffer, the snapshot criteria comprising a source volume indicator, a target volume indicator, an auto-select target indicator, a partial volume indicator, a source extents indicator, a redundancy level indicator, and a background copy indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and executing the plurality of fast replication operations comprising creating a snapshot set defined by metadata in the metadata buffer and deleting a specified snapshot set as specified by the snapshot set.

12. The method of claim 11, further comprising conducting an operation selected from the group consisting of:
providing information regarding a specified snapshot set;
deleting specified snapshot criteria from the snapshot set; and
terminating the plurality of fast replications operations specified by the snapshot set.

13. The method of claim 12, wherein adding snapshot criteria to a snapshot set is conducted using an API.

14. The method of claim 11, wherein adding snapshot criteria to a snapshot set and initiating a plurality of fast replication operations as specified by the snapshot set are conducted across multiple volumes and multiple controllers.

15. The method of claim 11, wherein initiating a plurality of fast replication operations may be conducted by any one of a plurality of servers in a storage system.

16. The method of claim 11, further comprising managing a list of controllers associated with the snapshot set.

17. A system for managing and conducting fast replication operations, the system comprising:
a plurality of storage volumes configured to store data;
at least one storage controller configured to manage the storage volumes;
the at least one storage controller further configured to add snapshot criteria to a snapshot set stored in a metadata buffer and execute a plurality of fast replications operations as specified by the snapshot set, the snapshot criteria comprising a source volume indicator, a target volume indicator, an auto-select target indicator, a partial volume indicator, a source extents indicator, a redundancy level indicator, and a background copy indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and the at least one storage controller further configured to execute the plurality of fast replications operations comprising creating a snapshot set defined by metadata in the metadata buffer and deleting a specified snapshot set as specified by the snapshot set.

18. The system of claim 17, wherein the at least one storage controller is further configured to:

manage a list of controllers associated with the snapshot set;

remove specified snapshot criteria from the snapshot set;

terminate the plurality of fast replications operations specified by the snapshot set; and provide information regarding a specified snapshot set.

19. A computer program product comprising a computer readable medium, wherein the computer readable medium when executed on a computer causes the computer to:

add snapshot criteria to a snapshot set stored in a metadata buffer, the snapshot criteria comprising a source volume indicator, a target volume indicator, an auto-select target indicator, a partial volume indicator, a source extents indicator, a redundancy level indicator, and a background copy indicator, the auto-select target indicator indicates whether the target volume for a plurality of fast replication operations is to be automatically selected or manually specified via the target volume indicator and a target extents indicator, the redundancy level indicator configured to select a redundancy in the range of no redundancy to a RAID level 50 redundancy, the partial volume indicator configured to indicate whether either an entire volume or a partial volume is to be snapshot, the background copy indicator configured to indicate whether data transfers for the plurality of fast replications operations are conducted as a background operation, and the source extents indicator configured to indicate starting and ending indices of tracks to be snapshot, wherein the metadata buffer stores metadata for storage-based operations; and execute the plurality of fast replications operations comprising creating a snapshot set defined by metadata in the metadata buffer and deleting a specified snapshot set as specified by the snapshot set.

20. The computer program product of claim 19, wherein the computer readable medium is further configured to cause the computer to:

manage a list of controllers associated with the snapshot set;

remove specified snapshot criteria from the snapshot set;

terminate the plurality of fast replications operations specified by the snapshot set; and provide information regarding a specified snapshot set.

* * * * *